Patented Mar. 27, 1934

1,952,367

UNITED STATES PATENT OFFICE 1,952,367

PROCESS FOR THE PRODUCTION OF RESIN-ACID COMPOSITIONS SUBSTITUTED IN THE CARBOXYLIC GROUP

Ewald Fonrobert, Wiesbaden, and Fritz Lemmer, Wiesbaden-Biebrich, Germany, assignors to Resinous Products & Chemical Co., Inc., Philadelphia, Pa.

No Drawing. Application January 28, 1930, Serial No. 424,132. In Germany August 28, 1929

5 Claims. (Cl. 260—98)

It is already known to esterify natural and synthetic resin acids. By means of polyhydric alcohols with high boiling points the esters are obtained by merely boiling them with the said resin acids with or without catalytic substances. Natural copals prior to the utilization must be melted for this purpose. The esterification of resin acids with alcohols of low boiling points is effected in the manner usual in organic chemistry, for instance by treating the resin acids in alkaline solution with an alkyl sulphate or by treating their silver salts with an alkyl halide.

We now have found, that resin acid esters may be obtained in a surprisingly easy manner by heating the resin acids with esters having a boiling point of more than 200° C. and the acid component of which may easily be eliminated from the reaction mixture. This elimination may be effected by physical methods, e. g. by distillation under ordinary pressure or in vacuo, by washing and so on, or by means of chemical methods, e. g. by destructive decomposition or by degradation or separation by means of oxidation.

The formation of the resin acid esters in this reaction is based upon an acidolysis in such a manner, that the resin acid takes the place of the acid previously contained in the ester, whilst said latter acid is being eliminated. The reaction is all the more rapid and all the more complete, the easier the acid set free may be removed from the reaction mixture. The advantage embodied by the new process for the production of resin acid esters on the one side is to be seen in the surprising simplicity of the process proper, and on the other hand in the purity of the products thus obtained.

Acidolysis reactions have already been known, for instance the acidolysis which takes place if one ester is heated with an alcohol of another kind than that combined in said ester and which possesses a higher boiling point than said alcohol combined in said ester. This reaction, however, takes to a certain extent, a course which is reverse to that of the present process, where it is not the alcohol radical but just the acid radical which forms the reaction part present in excess and which causes the acidolysis.

As resin acids all natural and synthetic resinous products may be employed here which contain free acid groups and which are capable of reacting with alcohols in forming esters, as particularly colophony, Kongo copal, Manila copal, Kauri copal; the acid synthetic resins obtained by condensation of acid natural resins with phenol-aldehyde condensation products or with other synthetic products, and finally the purely synthetic acid resins, as for instance the condensation products of salicylic acid with formaldehyde.

A particular advantage embodied by the new process consists in the fact that neutral copals, such as for instance Kongo copal, Kauri copal, Zanzibar copal etc., do not require to be melted prior to the esterification. They may be immediately heated together with the ester. The melting of the copal and the acidolysis takes place simultaneously, without resulting in a disturbing or excessive frothing of the molten mass which usually takes place during the melting of copal.

All esters possessing a boiling point of above 200° C. may be used as the ester component for the reaction. Excepted therefrom are only those esters of polyhydric alcohols with polybasic acids which undergo a change upon being heated, which would prevent the acidolysis otherwise possible according to the present process. It is for this reason that the phthalic acid glycerine ester can not be employed for the present process.

Instead of the esters, acid amides and similar combinations may also be employed. In this way a new class of resinous bodies is obtained which so far had not been available and which furnishes some products of considerable utility for some purposes. For instance, in this way nitrogenous synthetic resins with basic properties are to be obtained. Such resins may be employed with advantage in all cases where liberated acids have to be neutralized. Nitrogenous synthetic resins may also be of importance for chemical purposes, e. g. for special oxidations or for physiological purposes. As nitrogeneous combinations in connection herewith all combinations of the type

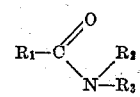

may be used, wherein $R_1$, $R_2$ and $R_3$ represent hydrogen or any organic radicals. Therefore not only aliphatic acid amides, as for instance acet-amide, but also acid derivatives of aromatic nitrogen compounds, as for instance acet-anilide, and also compounds may be used, in which the acid radical is also of aromatic nature.

*Example 1*

100 g. of French colophony are heated with 100 g. of phthalic acid dibutyl ester at 295–300° C. for a period of 8 hours. During the reaction it will be possible by providing a suitable vacuum to distill off the phthalic acid set free, whereby the reaction may be accelerated still further. The heating is continued in a suitable vacuum till all phthalic acid set free is distilled off as phthalic acid anhydride. Finally 149 g. of abietic acid butyl ester with an acid value of 24.5 are obtained. By treating the ester, after having dissolved it in a suitable solvent, such as for instance benzine, benzol or the like, with alkaline lye the ester may be freed from the last residues of acid. The thus obtained product has the acid value 2.7.

*Example 2*

250 g. of Kongo copal are heated with 74 g. of benzyl acetate to 300° C. for a period of 4 hours. During the heating a vigorous boiling takes place, but without an excessive frothing, which would make impossible further heating. Slowly a clear melt is produced, whilst acetic acid continuously set free is distilled off, by which the mass is also kept in motion and prevented from frothing. After the end of the heating period to 300° C. during 4 hours the provision of a vacuum for a short time will be sufficient to distill off any residues left of unchanged benzyl acetate and any copal oil that may have been produced. The resulting material consists of 204 g. of Kongo copal benzyl ester with an acid value of 20.6, a saponification number of 105.0 and a melting point of 43–52° C.

*Example 3*

250 g. of Kongo copal are mixed with 147 g. of stearic acid triglyceride (tristearine) and heated for a period of 4 hours at 300° C. The copal is melted out at the commencement of the reaction during the increase in temperature without very vigorous frothing. At 275° C. a calmly boiling and clear melt is formed. After the heating period to 300° C. the reaction product is heated up to 260° C. in a vacuum of 10–12 mm., in order to eliminate the stearic acid formed together with the copal oil produced during the melting out operation. The distillation residue consists of 233 g. of Kongo copal glycerine ester having the acid value 1.5; and the distillate consists of 155 g. of a mixture of stearic acid and copal oil with the acid value 160.8.

*Example 4*

250 g. of Kauri copal are heated with 74 g. of benzyl acetate to 300° C. for a period of 4 hours. The course of reaction is in this case the same as that of the examples with Kongo copal: during the rise in temperature at the beginning of the heating the copal is molten out and within a short time a calmly boiling, clear melt is obtained. After the heating to 300° C. and a further heating up to 260° C. in a vacuum of 12 mm., 202 g. of Kauri copal benzyl ester with the acid value 9.5 and the melting point 70–80° C. are obtained.

*Example 5*

250 g. of Manila copal and 103 g. of phthalic acid dibutyl ester are brought up to a temperature of 300° C. and maintained at that temperature for a period of 4 hours. In this case also, in the same way as in the previous examples referred to, a calmly boiling clear melt is produced, which is subsequently freed in a vacuum of 10–12 mm. up to 260° C. from the split off phthalic acid or the phthalic acid anhydride by distillation. The obtained produced consists of 192 g. of Manila copal butylester with the acid value 15.7 and melting point 70–80° C.

*Example 6*

200 parts of a synthetic resin produced in accordance with Example 5 of U. S. Patent 1,623,901, but not yet esterified with glycerine and, for this reason, still acid, are heated together with 112 parts of phthalic acid dibutyl ester at a temperature of 300° C. for a period of 5 hours. After cooling down to 200° C. and providing a vacuum the phthalic acid set free and the resin oil which may have formed are eliminated by increasing the temperature up to 250° C. The product consists of 182 parts of butyl ester of the synthetic resin acid employed, said ester having a melting point of 56–68° C., an acid value of 17.9 and a saponification number of 118.8.

*Example 7*

200 parts of Kongo copal and 42.5 parts of acetamide are heated to 300° C. for a period of 4 hours, care being taken by the suitable arrangement of condensers that the unchanged acetamide will flow back to the copal, whereas the acetic acid formed distills over. The reaction mixture hereafter is cooled down to 200° C. and subsequently brought up again to 250° C. after the provision of a vacuum, in order to eliminate also the acetamide which has not reacted, as well as the copal oil which may have formed. Finally 164 parts of amide of Kongo copal are obtained with the acid value 37.0 and the melting point 58–67° C.

*Example 8*

250 parts of the acid synthetic resin as used in Example 6 are heated with 106 parts of acetanilide to 300° C. for a period of 3½ hours, the acetic acid set free in consequence of the acidolysis reaction distilling over during that time in a receiver. After the heating to 300° C. the reaction mixture is cooled down to 200° C. and subsequently reheated in vacuo up to 250° C. for the purpose of eliminating the acetanilide which has not reacted. The final product consist of 275 parts of anilide of the acid synthetic resin employed with the acid value 13.4 and the melting point of 71–80° C.

Having now particularly described and ascertained the nature of our said invention, what we claim is:

1. A process for the production of resin-acid compositions substituted in the carboxyl group, consisting in heating to temperatures above 200° C. resin acids with an ester of other organic carboxylic acids which have a boiling point of more than 200° C. and the acid of which after having been set free may easily be eliminated, said acid of the used acid derivatives being eliminated after being set free.

2. A process for the production of resin-acid compositions substituted in the carboxyl group, consisting in heating to temperatures above 200° C. resin acids with an ester of other organic carboxylic acids which have a boiling point of more than 200° C. and the acid of which after having been set free may easily be eliminated, the volatile parts of the reaction mass being distilled off in vacuo, the residue of said distillation process forming the desired resin ester.

3. A process for the production of resin-acid compositions substituted in the carboxyl group, consisting in heating to temperatures above 200° C. such acid natural resins which otherwise must be melted before being worked to oil varnishes, directly and without being melted before, with a derivative of other organic acids which are substituted in the carboxylic group and have a boiling point of more than 200° C. and the acid of which after having been set free may easily be eliminated, said acid of the used acid derivatives being eliminated after being set free.

4. A process for the production of resin-acid compositions substituted in the carboxyl group, consisting in heating to temperatures above 200° C. such acid natural resins which otherwise must be melted before being worked to oil varnishes, directly and without being melted before, with an ester of other organic carboxylic acids which have a boiling point of more than 200° C. and the acid of which after having been set free may easily be eliminated, the volatile parts of the reaction mass being distilled off in vacuo, the residue of said distillation process forming the desired resin ester.

5. A process for the production of resin acid esters, consisting in heating to temperatures above 200° C. resin acids with an ester of other organic carboxylic acids with monohydric alcohols which have a boiling point of more than 200° C. and the acid of which after having been set free may easily be eliminated, said acid of the used acid derivatives being eliminated after being set free.

EWALD FONROBERT.
FRITZ LEMMER.